United States Patent
Bittner et al.

(10) Patent No.: US 10,155,900 B2
(45) Date of Patent: Dec. 18, 2018

(54) PROCESS FOR PRODUCING MINERAL OIL USING SURFACTANTS BASED ON A MIXTURE OF C24 GUERBET, C26 GUERBET, C28 GUERBET-CONTAINING HYDROCARBYL ALKOXYLATES

(71) Applicants: Christian Bittner, Bensheim (DE); Günter Oetter, Frankenthal (DE); Jack Tinsley, Mannheim (DE); Christian Spindler, Ludwigshafen (DE); Gabriela Alvarez-Juergenson, Mannheim (DE); Sophie Maitro-Vogel, Mannheim (DE)

(72) Inventors: Christian Bittner, Bensheim (DE); Günter Oetter, Frankenthal (DE); Jack Tinsley, Mannheim (DE); Christian Spindler, Ludwigshafen (DE); Gabriela Alvarez-Juergenson, Mannheim (DE); Sophie Maitro-Vogel, Mannheim (DE)

(73) Assignee: BASF SE, Ludwigshafen am Rhein (DE)

(*) Notice: Subject to any disclaimer, the term of this patent is extended or adjusted under 35 U.S.C. 154(b) by 0 days.

(21) Appl. No.: 15/263,710

(22) Filed: Sep. 13, 2016

(65) Prior Publication Data
US 2016/0376493 A1 Dec. 29, 2016

Related U.S. Application Data

(62) Division of application No. 13/659,393, filed on Oct. 24, 2012, now Pat. No. 9,475,978.

(60) Provisional application No. 61/550,453, filed on Oct. 24, 2011.

(51) Int. Cl.
*C09K 8/584* (2006.01)
*C09K 8/60* (2006.01)

(52) U.S. Cl.
CPC ............ *C09K 8/602* (2013.01); *C09K 8/584* (2013.01)

(58) Field of Classification Search
CPC .......... C09K 8/584; C09K 8/52; C09K 8/524; C09K 8/36; C09K 8/602; C09K 8/68; C09K 2208/18; C09K 8/28; C09K 8/26; C09K 8/32; C09K 8/528; C09K 19/54; C09K 2019/528; C09K 8/265; C09K 8/58; C09K 8/604; C09K 2208/02; C09K 2208/14; C09K 8/12; C09K 8/40; C09K 8/424; C09K 8/50; C09K 8/506; C09K 8/588; C09K 8/685; C09K 8/703; C09K 8/72; C09K 8/86; C09K 8/88; C09K 8/887; E21B 43/16; E21B 37/08; E21B 21/068; E21B 43/24; E21B 21/003; E21B 31/00; E21B 33/13; E21B 33/138; E21B 43/25; E21B 43/26; E21B 43/40; Y10S 507/902; Y10S 507/91; Y10S 507/923; Y10S 507/92
See application file for complete search history.

(56) References Cited

U.S. PATENT DOCUMENTS

| | | | |
|---|---|---|---|
| 3,119,880 A | 1/1964 | Koliar et al. | |
| 3,558,716 A | 1/1971 | Engelhardt et al. | |
| 3,864,407 A | 2/1975 | Yates | |
| 3,979,466 A | 9/1976 | Yates | |
| 5,741,947 A | 4/1998 | Wolf et al. | |
| 7,119,125 B1 * | 10/2006 | O'Lenick, Jr. | B01F 17/0057 516/25 |

(Continued)

FOREIGN PATENT DOCUMENTS

| | | |
|---|---|---|
| CA | 2790159 A1 | 9/2011 |
| DE | 3901095 A1 | 7/1990 |

(Continued)

OTHER PUBLICATIONS

Taylor, Kevin C., et al., "Water-Soluble Hydrophobically Associating Polymers for Improved Oil Recovery: A Literature Review", Journal of Petroleum Science and Engineering, vol. 19, (1998), pp. 265-280.

(Continued)

*Primary Examiner* — Kumar R Bhushan
(74) *Attorney, Agent, or Firm* — Drinker Biddle & Reath LLP

(57) ABSTRACT

The present invention relates to a surfactant mixture comprising at least three ionic surfactants which differ in terms of the hydrocarbyl moiety $(R^1)(R^2)$—CH—CH$_2$— and are of the general formula (I)

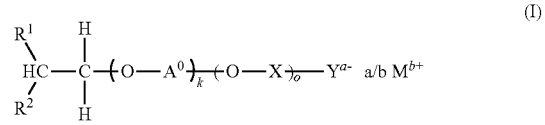

where $R^1$, $R^2$, $A^O$, k, X, o, Y, a, b, M are each as defined in the description and the claims. The invention further relates to the use and preparation thereof, and to aqueous surfactant formulations comprising the mixtures, and to processes for producing mineral oil by means of Winsor type III microemulsion flooding, in which the aqueous surfactant formulation is injected into a mineral oil deposit through injection wells and crude oil is withdrawn from the deposit through production wells.

11 Claims, No Drawings

(56) References Cited

U.S. PATENT DOCUMENTS

| | | | |
|---|---|---|---|
| 8,607,865 B2 * | 12/2013 | Bittner | B01F 17/0021 166/270.1 |
| 9,475,977 B2 * | 10/2016 | Bittner | C09K 8/584 |
| 9,475,978 B2 * | 10/2016 | Bittner | C09K 8/602 |
| 9,475,979 B2 * | 10/2016 | Bittner | C09K 8/584 |
| 2005/0170991 A1 | 8/2005 | Ruland et al. | |
| 2008/0194435 A1 | 8/2008 | Huff et al. | |
| 2008/0217064 A1 | 9/2008 | Stoian et al. | |
| 2009/0270281 A1 * | 10/2009 | Steinbrenner | C09K 8/584 507/237 |
| 2011/0220353 A1 * | 9/2011 | Bittner | C09K 8/584 166/270.1 |
| 2011/0220366 A1 * | 9/2011 | Bittner | B01F 17/0021 166/369 |
| 2011/0259583 A1 | 10/2011 | Bittner et al. | |
| 2011/0263467 A1 * | 10/2011 | Bittner | C09K 8/584 507/254 |
| 2011/0281779 A1 * | 11/2011 | Weerasooriya | C09K 8/584 507/254 |
| 2014/0116690 A1 * | 5/2014 | Bittner | C09K 8/584 166/270.1 |

FOREIGN PATENT DOCUMENTS

| | | |
|---|---|---|
| DE | 4325237 A1 | 2/1995 |
| DE | 10243361 A1 | 4/2004 |
| WO | WO-2006/131541 A1 | 12/2006 |
| WO | WO-2011037975 A3 | 7/2011 |
| WO | WO2011/110503 * | 9/2011 |
| WO | WO-2011110501 A1 | 9/2011 |
| WO | WO-2011110503 A1 | 9/2011 |
| WO | WO2011/130310 * | 10/2011 |
| WO | WO-2011/130310 A1 | 10/2011 |
| WO | WO2011/131549 * | 10/2011 |
| WO | WO-2011131549 A1 | 10/2011 |
| WO | WO-2011131719 A1 | 10/2011 |
| WO | WO-2011110502 A9 | 10/2012 |

OTHER PUBLICATIONS

Melrose, J.C., et al., "Role of Capillary Forces in Determining Microscopic Displacement Efficiency for Oil Recovery by Waterflooding", The Journal of Canadian Petroleum Technology, vol. 58, (1974), pp. 54-62.

"Products for Enhanced Oil Recovery", Hunstman Technical Bulletin, (2010), pp. 1-4.

Dean, R.M., "Selection and Evaluation of Surfactants for Field Pilots", Thesis presented to The University of Texas, (2011), 122 pages.

International Search Report (In German) for PCT/EP2012/070950 dated Mar. 27, 2013.

* cited by examiner

PROCESS FOR PRODUCING MINERAL OIL USING SURFACTANTS BASED ON A MIXTURE OF C24 GUERBET, C26 GUERBET, C28 GUERBET-CONTAINING HYDROCARBYL ALKOXYLATES

RELATED APPLICATIONS

This application is a divisional application of U.S. patent application Ser. No. 13/659,393, filed Oct. 24, 2012, which claims the benefit of U.S. Provisional patent application Ser. No. 1/550,453, filed Oct. 24, 2011. The entire contents of each of these applications are hereby incorporated by reference herein.

The present invention relates to a surfactant mixture, to the use and preparation thereof, and to aqueous surfactant formulations comprising the mixtures, and to processes for producing mineral oil by means of Winsor type III microemulsion flooding, in which the aqueous surfactant formulation is injected into a mineral oil deposit through injection wells and crude oil is withdrawn from the deposit through production wells.

In natural mineral oil deposits, mineral oil is present in the cavities of porous reservoir rocks which are sealed toward the surface of the earth by impervious top layers. The cavities may be very fine cavities, capillaries, pores or the like. Fine pore necks may, for example, have a diameter of only about 1 μm. As well as mineral oil, including fractions of natural gas, a deposit comprises water with a greater or lesser salt content.

In mineral oil extraction, a distinction is generally drawn between primary, secondary and tertiary extraction. In primary extraction, the mineral oil flows, after commencement of drilling of the deposit, of its own accord through the borehole to the surface owing to the autogenous pressure of the deposit.

After primary extraction, secondary extraction is therefore used. In secondary extraction, in addition to the boreholes which serve for the extraction of the mineral oil, the so-called production wells, further boreholes are drilled into the mineral oil-bearing formation. Water is injected into the deposit through these so-called injection wells in order to maintain the pressure or to increase it again. As a result of the injection of the water, the mineral oil is forced slowly through the cavities into the formation, proceeding from the injection well in the direction of the production well. However, this only works for as long as the cavities are completely filled with oil and the more viscous oil is pushed onward by the water. As soon as the mobile water breaks through cavities, it flows on the path of least resistance from this time, i.e. through the channel formed, and no longer pushes the oil onward.

By means of primary and secondary extraction, generally only approx. 30-35% of the amount of mineral oil present in the deposit can be extracted.

It is known that the mineral oil yield can be enhanced further by measures for tertiary oil extraction. A review of tertiary oil extraction can be found, for example, in "Journal of Petroleum Science of Engineering 19 (1998)", pages 265 to 280. Tertiary oil extraction includes, for example, thermal methods in which hot water or steam is injected into the deposit. This lowers the viscosity of the oil. The flow medium used may likewise be gases such as $CO_2$ or nitrogen.

Tertiary mineral oil extraction also includes methods in which suitable chemicals are used as assistants for oil extraction. These can be used to influence the situation toward the end of the water flow and as a result also to extract mineral oil hitherto held firmly within the rock formation.

Viscous and capillary forces act on the mineral oil which is trapped in the pores of the deposit rock toward the end of the secondary extraction, the ratio of these two forces relative to one another being determined by the microscopic oil separation. By means of a dimensionless parameter, the so-called capillary number, the action of these forces is described. It is the ratio of the viscosity forces (velocity× viscosity of the forcing phase) to the capillary forces (interfacial tension between oil and water×wetting of the rock):

$$N_c = \frac{\mu v}{\sigma \cos\theta}.$$

In this formula, μ is the viscosity of the fluid mobilizing mineral oil, v is the Darcy velocity (flow per unit area), σ is the interfacial tension between liquid mobilizing mineral oil and mineral oil, and θ is the contact angle between mineral oil and the rock (C. Melrose, C. F. Brandner, J. Canadian Petr. Techn. 58, October-December, 1974). The higher the capillary number, the greater the mobilization of the oil and hence also the degree of oil removal.

It is known that the capillary number toward the end of secondary mineral oil extraction is in the region of about $10^{-6}$ and that it is necessary to increase the capillary number to about $10^{-3}$ to $10^{-2}$ in order to be able to mobilize additional mineral oil.

For this purpose, it is possible to conduct a particular form of the flooding method—what is known as Winsor type III microemulsion flooding. In Winsor type III microemulsion flooding, the injected surfactants should form a Winsor type III microemulsion with the water phase and oil phase present in the deposit. A Winsor type III microemulsion is not an emulsion with particularly small droplets, but rather a thermodynamically stable, liquid mixture of water, oil and surfactants. The three advantages thereof are that
- a very low interfacial tension a between mineral oil and aqueous phase is thus achieved,
- it generally has a very low viscosity and as a result is not trapped in a porous matrix,
- it forms with even the smallest energy inputs and can remain stable over an infinitely long period (conventional emulsions, in contrast, require high shear forces which predominantly do not occur in the reservoir, and are merely kinetically stabilized).

The Winsor type III microemulsion is in an equilibrium with excess water and excess oil. Under these conditions of microemulsion formation, the surfactants cover the oil-water interface and lower the interfacial tension a more preferably to values of $<10^{-2}$ mN/m (ultra-low interfacial tension). In order to achieve an optimal result, the proportion of the microemulsion in the water-microemulsion-oil system, with a defined amount of surfactant, should by its nature be at a maximum, since this allows lower interfacial tensions to be achieved.

In this manner, it is possible to alter the form of the oil droplets (interfacial tension between oil and water is lowered to such a degree that the smallest interface state is no longer favored and the spherical form is no longer preferred), and they can be forced through the capillary openings by the flooding water.

When all oil-water interfaces are covered with surfactant, in the presence of an excess amount of surfactant, the Winsor type III microemulsion forms. It thus constitutes a reservoir for surfactants which cause a very low interfacial tension between oil phase and water phase. By virtue of the Winsor type III microemulsion being of low viscosity, it also migrates through the porous deposit rock in the flooding process (emulsions, in contrast, can become trapped in the porous matrix and block deposits). When the Winsor type III microemulsion meets an oil-water interface as yet uncovered with surfactant, the surfactant from the microemulsion can significantly lower the interfacial tension of this new interface, and lead to mobilization of the oil (for example by deformation of the oil droplets).

The oil droplets can subsequently combine to a continuous oil bank. This has two advantages:

Firstly, as the continuous oil bank advances through new porous rock, the oil droplets present there can coalesce with the bank.

Moreover, the combination of the oil droplets to give an oil bank significantly reduces the oil-water interface and hence surfactant no longer required is released again. Thereafter, the surfactant released, as described above, can mobilize oil droplets remaining in the formation.

Winsor type III microemulsion flooding is consequently an exceptionally efficient process, and requires much less surfactant compared to an emulsion flooding process. In microemulsion flooding, the surfactants are typically optionally injected together with cosolvents and/or basic salts (optionally in the presence of chelating agents). Subsequently, a solution of thickening polymer is injected for mobility control. A further variant is the injection of a mixture of thickening polymer and surfactants, cosolvents and/or basic salts (optionally with chelating agent), and then a solution of thickening polymer for mobility control. These solutions should generally be clear in order to prevent blockages of the reservoir.

The requirements on surfactants for tertiary mineral oil extraction differ significantly from requirements on surfactants for other applications: suitable surfactants for tertiary oil extraction should reduce the interfacial tension between water and oil (typically approx. 20 mN/m) to particularly low values of less than $10^{-2}$ mN/m in order to enable sufficient mobilization of the mineral oil. This has to be done at the customary deposit temperatures of approx. 15° C. to 130° C. and in the presence of water of high salt contents, more particularly also in the presence of high proportions of calcium and/or magnesium ions; the surfactants thus also have to be soluble in deposit water with a high salt content.

To fulfill these requirements, there have already been frequent proposals of mixtures of surfactants, especially mixtures of anionic and nonionic surfactants.

U.S. Pat. No. 7,119,125 B1 describes a mixture of sulfated Guerbet alcohol alkoxylate and of low molecular weight sulfated alkyl alkoxylate in oil production. Particularly good emulsifying properties are attributed to the bimodal distribution. However, these emulsifying properties do not play a major role in Winsor type III microemulsion flooding. Too much surfactant would be required for the emulsification of oil, and the shear forces required are barely present in the flooding operation (apart from the region around the injector).

US-A 2008/217064 describes a drilling fluid solution comprising a nonionic surfactant—consisting of at least one branched alkyl ethoxylate and a capped alkyl ethoxylate—and a detergent builder and a viscosifier. The nonionic surfactant may be a C10 Guerbet alcohol ethoxylate.

US-A 2009/270281 describes the use of a surfactant mixture for the production of mineral oil, which comprises at least one surfactant with an alkyl radical of 12 to 30 carbon atoms and a branched cosurfactant with an alkyl radical of 6 to 11 carbon atoms. The degree of branching of the alkyl radical in the cosurfactant ranges from 1 to 2.5, and may thus comprise Guerbet alcohols of the 2-ethylhexyl or 2-propylheptyl type. The cosurfactants may be alcohol ethoxylates or anionically modified alcohol ethoxylates (for example alkyl ether sulfate).

Further surfactant mixtures are described in WO 2011/037975 A2, WO2011/110501 A1, WO 2011/110502 A1, WO2011/110503 A1, and in international applications PCT/EP2011/055884 and PCT/EP2011/056325.

The use parameters, for example type, concentration and mixing ratio of the surfactants used relative to one another, are therefore adjusted by the person skilled in the art to the conditions prevailing in a given oil formation (for example temperature and salt content).

As described above, mineral oil production is proportional to the capillary number. The lower the interfacial tension between oil and water, the higher the capillary number. The higher the mean number of carbon atoms in the crude oil, the more difficult low interfacial tensions are to achieve. For low interfacial tensions, suitable surfactants are those which possess a long alkyl radical. The longer the alkyl radical, the better the reducibility of the interfacial tensions. However, the availability of such compounds is very limited.

It is therefore an object of the present invention to provide a particularly efficient surfactant or an efficient surfactant mixture for use for surfactant flooding, and an improved process for tertiary mineral oil production. It is further object of the invention to provide a process for preparing these surfactants or this surfactant mixture.

The object is achieved by a surfactant mixture comprising at least three ionic surfactants which differ in terms of the hydrocarbyl moiety $(R^1)(R^2)$—CH—CH$_2$— and are of the general formula (I)

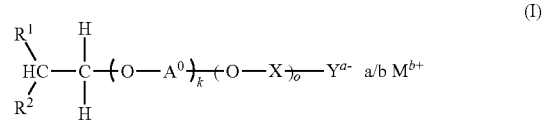

where $R^1$ is a linear or branched, saturated or unsaturated aliphatic hydrocarbyl radical having 10 to 12 carbon atoms;

$R^2$ is a linear or branched, saturated or unsaturated aliphatic hydrocarbyl radical having 12 to 14 carbon atoms;

each $A^0$ is independently ethylene, propylene (preferably 1,2-propylene) or butylene (preferably 1,2-butylene);

k is an integer from 1 to 99,

X is a branched or unbranched alkylene group which has 1 to 10 carbon atoms and may be substituted by an OH group;

o is 0 or 1;

$M^{b+}$ is a cation;

$Y^{a-}$ is a sulfate group, sulfonate group, carboxylate group or phosphate group (preferably a sulfate or carboxylate group, more preferably a sulfate group);

b is 1, 2 or 3 (preferably 1) and a is 1 or 2 (preferably 1).

A further aspect of the present invention relates to an aqueous surfactant formulation comprising an inventive surfactant mixture, said surfactant formulation preferably having a total surfactant content of 0.05 to 5% by weight based on the total amount of the aqueous surfactant formulation.

A further aspect of the present invention relates to the use of an inventive surfactant mixture or of an inventive surfactant formulation in mineral oil production by means of Winsor type III microemulsion flooding.

A further aspect of the present invention relates to processes for producing mineral oil by means of Winsor type III microemulsion flooding, in which an inventive aqueous surfactant formulation is injected into a mineral oil deposit through at least one injection well for the purpose of lowering the interfacial tension between oil and water to <0.1 mN/m, and crude oil is withdrawn from the deposit through at least one production well.

Accordingly, a mixture of at least 3 ionic surfactants which differ in terms of the hydrocarbyl moiety $(R^1)(R^2)$—CH—CH$_2$— and a process for tertiary mineral oil production by means of Winsor type III microemulsion flooding are provided, in which an aqueous surfactant formulation comprising at least three ionic surfactants which differ in terms of the hydrocarbyl moiety $(R^1)(R^2)$—CH—CH$_2$— is injected into a mineral oil deposit through at least one injection well, the interfacial tension between oil and water is lowered to values of <0.1 mN/m, preferably to values of <0.05 mN/m, more preferably to values of <0.01 mN/m, and crude oil is withdrawn from the deposit through at least one production well.

In a preferred embodiment, $R^1$ is a linear or branched, saturated or unsaturated aliphatic hydrocarbyl radical having 10 or 12 carbon atoms; and $R^2$ is a linear or branched, saturated or unsaturated aliphatic hydrocarbyl radical having 12 or 14 carbon atoms.

In a particularly preferred embodiment, $R^1$ is a linear saturated or unsaturated (preferably saturated) aliphatic hydrocarbyl radical having 10 or 12 carbon atoms; and $R^2$ is a linear saturated or unsaturated (preferably saturated) aliphatic hydrocarbyl radical having 12 or 14 carbon atoms, the result of which is especially the presence of at least 3 ionic surfactants of the general formula (I) with hydrocarbyl radicals having 24 carbon atoms, 26 carbon atoms and 28 carbon atoms. When the molar sum is formed from these three surfactants, the $C_{24}$ surfactant of the general formula (I) is more preferably within a range from 40% to 60%, the $C_{26}$ surfactant of the general formula (I) within a range from 30% to 50% and the $C_{28}$ surfactant of the general formula (I) within a range from 7% to 20%, based on the sum. It is additionally preferred that the proportion by weight of the 3 ionic surfactants based on the total weight of the inventive surfactant mixture is greater than 50% by weight, more preferably greater than 60% by weight, even more preferably greater than 70% by weight, even more preferably greater than 80% by weight, most preferably greater than 90% by weight.

Preferably, k is an integer in the range from 4 to 50.

Preferably, the $(OX)_oY^-$ radical in formula (I) is $OS(O)_2O^-$, $OCH_2CH_2S(O)_2O^-$, $OCH_2CH(OH)CH_2S(O)_2O^-$, $O(CH_2)_3S(O)_2O^-$, $S(O)_2O^-$, $CH_2C(O)O^-$ or $CH_2CH(R')C(O)O^-$, where R' is hydrogen or an alkyl radical having 1 to 4 carbon atoms (for example methyl).

The alkyleneoxy (AO) groups $OA^0$ in formula (I), which occur k times, may be the same or different. If they are different, they may be arranged in random distribution, alternately or in blocks, i.e. in two, three, four or more blocks.

Accordingly, $(OA)_k$ in formula (I) may represent n butyleneoxy (BuO), m propyleneoxy (PO) and l ethyleneoxy (EO) groups, where n, m, l are natural numbers including 0, and: n+m+l=k.

Preferably, the n butyleneoxy, m propyleneoxy and l ethyleneoxy groups are at least partially arranged in blocks (in numerical terms, preferably to an extent of at least 50%, more preferably to an extent of at least 60%, even more preferably to an extent of at least 70%, more preferably to an extent of at least 80%, more preferably to an extent of at least 90%, especially completely).

In the context of the present invention, "arranged in blocks" means that at least one AO has a neighboring AO group which is chemically identical, such that these at least two AO form a block.

Preferably, the $(R^1)(R^2)$—CH—CH$_2$— radical in formula (I) is followed, representing $(OA)_k$, by a butyleneoxy block with n butyleneoxy groups, followed by a propyleneoxy block with m propyleneoxy groups, and finally an ethyleneoxy block with l ethyleneoxy groups.

Preferably, m is an integer from 4 to 15 (more preferably 5 to 9) and/or l is an integer from 0 to 25 (more preferably 4 to 15) and/or n is an integer from 2 to 15 (more preferably 5 to 9).

In a more preferred embodiment, the invention relates to a mixture of three ionic surfactants in terms of the hydrocarbyl moiety $(R^1)(R^2)$—CH—CH$_2$— and to the use thereof, where m is a number from 4 to 15, n is a number from 0 to 15 and $Y^{a-}$ is selected from the group of sulfate groups, sulfonate groups and carboxylate groups, where the BuO, PO and EO groups are present to an extent of more than 80% in block form in the sequence BuO, PO, ED commencing from $(R^1)(R^2)$—CH—CH$_2$, and the sum of l+m+n is in the range from 5 to 49.

A particularly preferred embodiment is when n is a number from 2 to 15, m is a number from 5 to 9, and $Y^{a-}$ is selected from the group of sulfate groups, sulfonate groups and carboxylate groups, where the A and B groups are present to an extent of more than 80% in block form in the sequence BuO, PO and ED commencing from $(R^1)(R^2)$—CH—CH$_2$, the sum of l+m+n is in the range from 4 to 50 and the BuO block consists to an extent of more than 80% of 1,2-butylene oxide.

A preferred inventive surfactant mixture further comprises surfactants of the formula

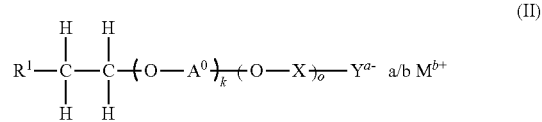

(II)

and of the formula

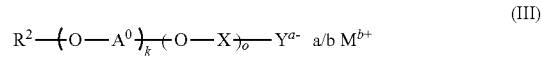

(III)

where $R^1$, $R^2$, $A^0$, X, $Y^{a-}$, $M^{b+}$, k, o, a and b are each as defined for formula (I).

Preferably, the proportion of surfactants of the formula (I) in relation to the sum of the amounts of surfactants of the formulae (I), (II) and (III) is in the range from 80% by weight to 99% by weight.

In a particularly preferred embodiment of the invention, in general formula (II), $R^1$ is a linear, saturated, aliphatic hydrocarbyl radical having 10 or 12 carbon atoms, and $R^2$ in the general formula (III) is a linear, saturated, aliphatic hydrocarbyl radical having 12 or 14 carbon atoms.

In the process according to the invention as described above for mineral oil production by means of Winsor type III microemulsion flooding, an aqueous surfactant formulation comprising at least three surfactants of the general formula (I) which differ in terms of the hydrocarbyl moiety $(R^1)(R^2)$—CH—CH$_2$— is used. It may further comprise further surfactants and/or other components.

In the process according to the invention for tertiary mineral oil production by means of Winsor type III microemulsion flooding, the use of the inventive surfactant mixture lowers the interfacial tension between oil and water to values of <0.1 mN/m, preferably to <0.05 mN/m, more preferably to <0.01 mN/m. The interfacial tension between oil and water is thus lowered to values in the range from 0.1 mN/m to 0.0001 mN/m, preferably to values in the range from 0.05 mN/m to 0.0001 mN/m, more preferably to values in the range from 0.01 mN/m to 0.0001 mN/m.

The three surfactants which differ in terms of the hydrocarbyl moiety $(R^1)(R^2)$—CH—CH$_2$— can be encompassed by the general formula (I). The difference can arise through the number of carbon atoms, the number of unsaturated bonds, the branching frequency and/or the degree of branching. More particularly, the surfactants differ in the chain length for $R^1$ and $R^2$. By way of example, $R^1/R^2$ be hydrocarbyl chains having 10/12, 10/13, 10/14, 11/12, 11/13, 11/14, 12/12, 12/13, 12/14, preferably 10/12, 10/14, 12/12, 12/14, carbon atoms. As a result of the preparation, it is also possible for more than three different surfactants of the general formula to be present in the surfactant formulation. Preferably, the three surfactants with 24, 26 and 28 carbon atoms in the hydrocarbyl moiety $(R^1)(R^2)$—CH—CH$_2$— constitute the main components of the inventive surfactant mixture. The proportion thereof is preferably at least 25% by weight, based on the total weight of the surfactant mixture, more preferably at least 30% by weight, more preferably at least 40% by weight, more preferably at least 50% by weight.

The $R^1$ radical is a linear or branched, saturated or unsaturated aliphatic hydrocarbyl radical having 10 to 12 carbon atoms. The $R^2$ radical is a linear or branched, saturated or unsaturated aliphatic hydrocarbyl radical having 12 to 14 carbon atoms. $R^1$ is either identical to $R^2$ or preferably has not more than two carbon atoms (more preferably exactly two carbon atoms) fewer than $R^2$.

In the case of branched $R^1$ or $R^2$ radicals, the degree of branching for $R^1$ or $R^2$ is preferably in the range of 0.1-5 (preferably of 0.1-1.5). For the branched aliphatic hydrocarbyl radical $(R^1)(R^2)$—CHCH$_2$, this gives rise to a degree of branching of 1.2 to 11 (preferably 1.2 to 4).

The term "degree of branching" is defined here in a manner known in principle as the number of methyl groups in a molecule of the alcohol minus 1. The mean degree of branching is the statistical mean of the degrees of branching of all molecules in one sample.

However, a preferred embodiment is the use of linear saturated or unsaturated $R^1$ radicals having 10 or 12 carbon atoms, or $R^2$ having 12 or 14 carbon atoms. Particular preference is given to the use of linear saturated $R^1$ and $R^2$ radicals. This gives a degree of branching of 1 for the aliphatic hydrocarbyl radical $(R^1)(R^2)$—CHCH$_2$.

In the above-defined general formula, l, m and n are each natural numbers including 0, i.e. 0, 1, 2 etc. It is, however, clear to the person skilled in the art in the field of polyalkoxylates that this definition is the definition of a single surfactant in each case. In the case of presence of surfactant mixtures or surfactant formulations which comprise a plurality of surfactants of the general formula, the numbers l and m are each mean values over all molecules of the surfactants, since the alkoxylation of alcohol with ethylene oxide and/or propylene oxide and/or butylene oxide in each case affords a certain distribution of chain lengths. This distribution can be described in a manner known in principle by what is called the polydispersity D. $D=M_w/M_n$ is the quotient of the weight-average molar mass and the number-average molar mass. The polydispersity can be determined by means of the methods known to those skilled in the art, for example by means of gel permeation chromatography.

Preferably, l is a number from 0 to 99, preferably 1 to 40, more preferably 1 to 20.

Preferably, m is a number from 0 to 99, preferably 1 to 20, more preferably 4 to 15.

Preferably, n is a number from 0 to 99, preferably 1 to 20, more preferably 2 to 15.

According to the invention, the sum of l+m+n (=k) is a number which is in the range from 1 to 99, preferably in the range from 5 to 50, more preferably in the range from 8 to 39.

In formula (I), X is a branched or unbranched alkylene group which has 1 to 10 and preferably 2 to 4 carbon atoms and may be substituted by an OH group. The alkylene group is preferably a methylene, ethylene or propylene group. More particularly, X is preferably CH$_2$CH$_2$, CH$_2$CH(OH)CH$_2$, (CH$_2$)$_3$, CH$_2$ or CH$_2$CH(R'), where R' is hydrogen or an alkyl radical having 1 to 4 carbon atoms (for example methyl). X may be present (o=1) or absent (o=0).

In the above general formula, $Y^{a-}$ is a sulfonate, sulfate, carboxylate group or phosphate group (preferably sulfonate, sulfate or carboxylate group, especially sulfate and carboxylate). a may thus have values of 1 or 2.

In the above formula, $M^+$ is a cation, preferably a cation selected from the group of Na$^+$, K$^+$, Li$^+$, NH$_4^+$, H$^+$, Mg$^{2+}$ and Ca$^{2+}$ (preferably Na$^+$, K$^+$ or NH$_4^+$). Overall, b may have values of 1, 2 or 3.

The alcohols $(R^1)(R^2)$—CH—CH$_2$—OH which can serve as a starting compound for preparation of the inventive surfactants are obtainable, for example, by the dimerization of alcohols of the $R^1$CH$_2$CH$_2$OH and $R^2$OH type with elimination of water.

Accordingly, a further aspect of the present invention is a process for preparing an inventive surfactant mixture, comprising the steps of:
(a) preparing Guerbet alcohols of the general formula (IV) $(R^1)(R^2)$—CH—CH$_2$OH (IV), where $R^1$ and $R^2$ are each as defined above, by condensing a mixture of at least two primary alcohols of the formula R—CH$_2$—CH$_2$—OH, where R is a linear or branched, saturated or unsaturated aliphatic hydrocarbyl radical having 10 to 12 carbon atoms,
(b) alkoxylating the alcohols obtained in process step (a),
(c) reacting the alcohol alkoxylates obtained in step (b) with a $Y^{a-}$ group, optionally to form a spacer group OX.

The preparation of the Guerbet alcohol of the general formula (IV) $(R^1)(R^2)$—CH—CH$_2$OH in process step (a) is known to those skilled in the art.

In the course of the Guerbet reaction, primary alcohols are ultimately dimerized to give β-branched primary alcohols in the presence of suitable catalysts. The primary products formed from the alcohol are aldehydes, which subsequently dimerize by aldol condensation with elimination of water and subsequent hydrogenation to give saturated alcohols. In addition to the main product, the Guerbet alcohol, it is also possible for various by-products to form, for example unsaturated β-branched primary alcohols if the hydrogenation of the double bond is incomplete, saturated α-branched aldehydes if the hydrogenation to give the Guerbet alcohol was incomplete, or more particularly β-branched primary alcohols which have additional branches in the side chain or main chain.

The dimerization of the alcohols of the formula R—CH$_2$CH$_2$—OH may give rise to a mixture of alcohols. This may include a C12C14 fatty alcohol mixture (linear, saturated), a C12C14 mixture of Ziegler alcohols with 12 and 14 carbon atoms, a C12C14 fatty alcohol mixture (linear and partly unsaturated) or a mixture of C12C14 oxo alcohol.

The dimerization of the alcohols of the formula R—CH$_2$CH$_2$—OH where R is a linear or branched, saturated or unsaturated aliphatic hydrocarbyl radical having 10 or 12 carbon atoms affords, in a preferred embodiment of the invention, Guerbet alcohols having 24, 26 and 28 carbon atoms.

In a particularly preferred embodiment, R is a linear saturated or unsaturated (preferably saturated) aliphatic hydrocarbyl radical having 10 or 12 carbon atoms.

To prepare the Guerbet alcohols in process step (a), mixtures of the alcohols (II) are condensed. Preferably, the proportion of alcohols where R=10 is between 60-80 mol %, the proportion of alcohols where R=12 between 20-40 mol %. Particular preference is given to reacting about 70 mol % of alcohols where R=10 and 30 mol % of alcohols where R=12.

The condensation of alcohols (II) to give Guerbet alcohols is preferably performed in the presence of 0.5 to 10% by weight, based on the alcohol, of alkali metal or alkaline earth metal hydroxide, for example lithium hydroxide, sodium hydroxide, cesium hydroxide or potassium hydroxide, preferably potassium hydroxide. With a view to a high reaction rate and a low proportion of secondary components, it will be necessary to use the alkali metal hydroxide or alkaline earth metal hydroxide in a concentration of 3 to 6% by weight, based on the alcohol. The alkali metal hydroxide or alkaline earth metal hydroxide can be used in solid form (flakes, powder) or in the form of a 30 to 70%, preferably 50%, aqueous solution.

In a preferred embodiment, the alcohols of the formula (II) are condensed in the presence of NaOH and/or KOH.

Suitable catalyst(s) are the catalysts known from the prior art, for example in U.S. Pat. No. 3,119,880 (nickel, lead salts), in U.S. Pat. No. 3,555,8716 (copper, lead, zinc, chromium, molybdenum, tungsten and manganese oxides), in U.S. Pat. No. 3,979,466 (palladium complexes) or else in U.S. Pat. No. 3,864,407 (silver complexes). Preference is given to using ZnO as a catalyst for the dimerization.

The catalyst(s) preferably comprise(s) ZnO catalysts, which are generally added to the mixture from which the Guerbet alcohols are prepared.

The mixture of Guerbet alcohols can be prepared by the process known from DE 3901095 A1.

In a preferred embodiment of the invention, the Guerbet alcohols are synthesized in process step (a) at a temperature in the range from 150 to 320° C., preferably at a temperature in the range from 180 to 280° C., optionally in the presence of a catalyst or catalysts.

The surfactants of the general formula can be prepared in a manner known in principle by alkoxylating corresponding alcohols (R$^1$)(R$^2$)—CH—CH$_2$—OH in process step (b). The performance of such alkoxylations is known in principle to those skilled in the art. It is likewise known to those skilled in the art that the molar mass distribution of the alkoxylates can be influenced through the reaction conditions, especially the selection of the catalyst.

The surfactants of the general formula can preferably be prepared in process step (b) by base-catalyzed alkoxylation. In this case, the alcohol (R$^1$)(R$^2$)—CH—CH$_2$—OH can be admixed in a pressure reactor with alkali metal hydroxides, preferably potassium hydroxide, or with alkali metal alkoxides, for example sodium methoxide. Water still present in the mixture can be drawn off by means of reduced pressure (for example <100 mbar) and/or increasing the temperature (30 to 150° C.). Thereafter, the alcohol is present in the form of the corresponding alkoxide. This is followed by inertization with inert gas (for example nitrogen) and stepwise addition of the alkylene oxide(s) at temperatures of 60 to 180° C. up to a maximum pressure of 10 bar. In a preferred embodiment, the alkylene oxide is metered in initially at 130° C. In the course of the reaction, the temperature rises up to 170° C. as a result of the heat of reaction released. In a further preferred embodiment of the invention, the butylene oxide is first added at a temperature in the range from 125 to 145° C., then the propylene oxide is added at a temperature in the range from 130 to 145° C., and then the ethylene oxide is added at a temperature in the range from 125 to 155° C. At the end of the reaction, the catalyst can be neutralized, for example by adding acid (for example acetic acid or phosphoric acid), and filtered off if required.

However, the alkoxylation of the alcohols (R$^1$)(R$^2$)—CH—CH$_2$—OH can also be undertaken by means of other methods, for example by acid-catalyzed alkoxylation. In addition, it is possible to use, for example, double hydroxide clays, as described in DE 4325237 A1, or it is possible to use double metal cyanide catalysts (DMC catalysts). Suitable DMC catalysts are disclosed, for example in DE 10243361 A1, especially in paragraphs [0029] to [0041] and the literature cited therein. For example, it is possible to use catalysts of the Zn—Co type. To perform the reaction, the alcohol (R$^1$)(R$^2$)—CH—CH$_2$—OH can be admixed with the catalyst, and the mixture can be dewatered as described above and reacted with the alkylene oxides as described. Typically not more than 1000 ppm of catalyst based on the mixture are used, and the catalyst can remain in the product owing to this small amount. The amount of catalyst may generally be less than 1000 ppm, for example 250 ppm or less.

Process step (c) relates to the reaction of the alcohol alkoxylates obtained in step (b) with a Y$^{a-}$ group, optionally with formation of a spacer group OX.

For example, it is possible to introduce sulfate and phosphate groups by reacting them with the alcohol directly (optionally after activation). Sulfonate groups can be introduced by vinyl addition, substitution reaction or aldol reaction, optionally with subsequent hydrogenation, to obtain corresponding spacers OX. Alternatively, the alcohol can also be converted to a chloride beforehand, which is subsequently amenable to a direct sulfonation. Carboxylates can be obtained, for example, by reaction with chloroacetate, acrylate or substituted acrylates H$_2$C═(R')C(O)O$^-$, where R' is H or an alkyl radical having 1 to 4 carbon atoms.

In principle, the anionic Y$^{a-}$ group is composed of the functional Y$^{a-}$ group, which is a sulfate, sulfonate, carboxylate or phosphate group, and the spacer OX, which in the simplest case may be a single bond (o=0). In the case of a sulfate group, it is possible, for example, to employ the reaction with sulfuric acid, chlorosulfonic acid or sulfur trioxide in a falling-film reactor with subsequent neutralization. In the case of a sulfonate group, it is possible, for example, to employ the reaction with propane sultone and subsequent neutralization, with butane sultone and subsequent neutralization, with vinylsulfonic acid sodium salt or with 3-chloro-2-hydroxypropanesulfonic acid sodium salt. To prepare sulfonates, the terminal OH group can also be converted to a chloride, for example with phosgene or thionyl chloride, and then reacted, for example, with sulfite. In the case of a carboxylate group, it is possible, for example, to employ the oxidation of the alcohol with oxygen and subsequent neutralization, or the reaction with chloroacetic acid sodium salt. Carboxylates can also be obtained, for example, by Michael addition of (meth)acrylic acid or ester. Phosphates can be obtained, for example, by esterification reaction with phosphoric acid or phosphorus pentachloride.

In addition to the surfactants of the general formulae (I), (II) and (III), the formulation may additionally optionally comprise further surfactants. These are, for example, anionic surfactants of the alkylarylsulfonate, petroleumsulfonate or olefinsulfonate (alpha-olefinsulfonate or internal olefinsulfonate) type and/or nonionic surfactants of the alkyl ethoxylate or alkyl polyglucoside type. It is also possible to use betaine surfactants. These further surfactants may especially also be oligomeric or polymeric surfactants. It is advantageous to use such polymeric cosurfactants to reduce the amount of surfactants needed to form a microemulsion. Such polymeric cosurfactants are therefore also referred to as "microemulsion boosters". Examples of such polymeric surfactants comprise amphiphilic block copolymers which comprise at least one hydrophilic block and at least one hydrophobic block. Examples comprise polypropylene oxide-polyethylene oxide block copolymers, polyisobutene-polyethylene oxide block copolymers, and comb polymers with polyethylene oxide side chains and a hydrophobic main chain, where the main chain preferably comprises essentially olefins or (meth)acrylates as monomers. The term "polyethylene oxide" here should in each case include polyethylene oxide blocks comprising propylene oxide units as defined above. Further details of such surfactants are disclosed in WO 2006/131541 A1.

In the process according to the invention for mineral oil production, a suitable aqueous formulation of the surfactants of the general formula is injected through at least one injection well into the mineral oil deposit, and crude oil is withdrawn from the deposit through at least one production well. The term "crude oil" in this context of course does not mean single-phase oil, but rather the usual crude oil-water emulsions. In general, a deposit is provided with several injection wells and with several production wells.

The main effect of the surfactant lies in the reduction of the interfacial tension between water and oil—desirably to values significantly <0.1 mN/m. After the injection of the surfactant formulation, known as "surfactant flooding", or preferably the Winsor type III "microemulsion flooding", the pressure can be maintained by injecting water into the formation ("water flooding") or preferably a higher-viscosity aqueous solution of a polymer with strong thickening action ("polymer flooding"). Also known, however, are techniques by which the surfactants are first of all allowed to act on the formation. A further known technique is the injection of a solution of surfactants and thickening polymers, followed by a solution of thickening polymer. The person skilled in the art is aware of details of the industrial performance of "surfactant flooding", "water flooding", and "polymer flooding", and employs an appropriate technique according to the type of deposit.

For the process according to the invention, an aqueous formulation which comprises surfactants of the general formula (I) is used. In addition to water, the formulations may optionally also comprise water-miscible or at least water-dispersible organic substances or other substances. Such additives serve especially to stabilize the surfactant solution during storage or transport to the oil field. The amount of such additional solvents should, however, generally not exceed 50% by weight, preferably 20% by weight. In a particularly advantageous embodiment of the invention, exclusively water is used for formulation. Examples of water-miscible solvents include especially alcohols such as methanol, ethanol and propanol, butanol, sec-butanol, pentanol, butyl ethylene glycol, butyl diethylene glycol or butyl triethylene glycol.

In a preferred embodiment of the invention, the three surfactants of the general formula (I) which differ in terms of the hydrocarbyl moiety $(R^1)(R^2)$—CH—$CH_2$— should constitute the main component among all surfactants in the formulation which is ultimately injected into the deposit. These are preferably at least 25% by weight, more preferably at least 30% by weight, even more preferably at least 40% by weight and even more preferably still at least 50% by weight of all surfactants used.

The mixture used in accordance with the invention can preferably be used for surfactant flooding of deposits. It is especially suitable for Winsor type III microemulsion flooding (flooding in the Winsor III range or in the range of existence of the bicontinuous microemulsion phase). The technique of microemulsion flooding has already been described in detail at the outset.

In addition to the surfactants, the formulations may also comprise further components, for example $C_4$ to $C_8$ alcohols and/or basic salts (so-called "alkali surfactant flooding"). Such additives can be used, for example, to reduce retention in the formation. The ratio of the alcohols based on the total amount of surfactant used is generally at least 1:1—however, it is also possible to use a significant excess of alcohol. The amount of basic salts may typically range from 0.1% by weight to 5% by weight. It is optionally possible to add chelating agents (for example EDTA) to the basic salts—typically 0.03% by weight to 5% by weight.

The deposits in which the process is employed generally have a temperature of at least 10° C., for example 10 to 150° C., preferably a temperature of at least 15° C. to 120° C. The total concentration of all surfactants together is 0.05 to 5% by weight, based on the total amount of the aqueous surfactant formulation, preferably 0.1 to 2.5% by weight. The person skilled in the art makes a suitable selection according to the desired properties, especially according to the conditions in the mineral oil formation. It is clear here to the person skilled in the art that the concentration of the surfactants can change after injection into the formation because the formulation can mix with formation water, or surfactants can also be absorbed on solid surfaces of the formation. It is the great advantage of the mixture used in accordance with the invention that the surfactants lead to a particularly good lowering of interfacial tension.

It is of course possible and also advisable first to prepare a concentrate which is only diluted on site to the desired concentration for injection into the formation. In general, the total concentration of the surfactants in such a concentrate is 10 to 45% by weight.

EXAMPLES

Part I: Synthesis of the Surfactants

General Method 1: Preparation of the Guerbet Alcohol

In a 1 l flask, the alcohol(s) (1 eq.) is/are initially charged and, if necessary, melted at 50° C. KOH powder (0.24 eq.) and zinc oxide (5% by weight based on the starter alcohol) are added while stirring. The reaction mixture is heated as quickly as possible to 180-230° C. and the water of reaction which forms is distilled off via a distillation outlet. For the fastest possible removal of the water of reaction, the glass flask is optionally insulated with aluminum foil. The reaction mixture is stirred at the given temperature for a further 6 to 30 hours. The alcohol mixture formed is analyzed by gas chromatography and used for the subsequent alkoxylation without further workup.

General Method 2: Alkoxylation by Means of KOH Catalysis (Relevant to use of EO, PO and/or 1,2-BuO)

In a 2 l autoclave, the alcohol to be alkoxylated (1.0 eq) is optionally admixed with an aqueous KOH solution comprising 50% by weight of KOH. The amount of KOH is 0.2% by weight of the product to be prepared. While stirring, the mixture is dewatered at 100° C. and 20 mbar for 2 h. This is followed by purging with $N_2$ three times, establishment of a supply pressure of approx. 1.3 bar of $N_2$, and an increase in the temperature to 120 to 130° C. The alkylene oxide is metered in such that the temperature remains between 125° C. and 155° C. (in the case of ethylene oxide) or 130 and 145° C. (in the case of propylene oxide) or 125 and 145° C. (in the case of 1,2-butylene oxide). This is followed by stirring at 125 to 145° C. for a further 5 h, purging with $N_2$, cooling to 70° C. and emptying of the reactor. The basic crude product is neutralized with the aid of acetic acid. Alternatively, the neutralization can also be effected with commercial magnesium silicates, which are subsequently filtered off. The light-colored product is characterized with the aid of a $^1$H NMR spectrum in $CDCl_3$, gel permeation chromatography and an OH number determination, and the yield is determined.

General Method 3: Alkoxylation by Means of DMC Catalysis

In a 2 l autoclave, the alcohol to be alkoxylated (1.0 eq) is mixed with a double metal cyanide catalyst (for example DMC catalyst of the Zn—Co type from BASF) at 80° C. To activate the catalyst, approximately 20 mbar is applied at 80° C. for 1 h. The amount of DMC is 0.1% by weight or less of the product to be prepared. This is followed by purging three times with $N_2$, establishment of a supply pressure of approx. 1.3 bar of $N_2$ and a temperature increase to 120 to 130° C. The alkylene oxide is metered in such that the temperature remains between 125° C. and 135° C. (in the case of ethylene oxide) or 130 and 140° C. (in the case of propylene oxide) or 135 and 145° C. (in the case of 1,2-butylene oxide). This is followed by stirring at 125 to 145° C. for a further 5 h, purging with $N_2$, cooling to 70° C. and emptying of the reactor. The light-colored product is characterized with the aid of a $^1$H NMR spectrum in $CDCl_3$, gel permeation chromatography and OH number determination, and the yield is determined.

General Method 4: Sulfonation by Means of Chlorosulfonic Acid

In a 1 l round-neck flask, the alkyl alkoxylate to be sulfonated (1.0 eq) is dissolved in 1.5 times the amount of dichloromethane (based on percent by weight) and cooled to 5 to 10° C. Thereafter, chlorosulfonic acid (1.1 eq) is added dropwise such that the temperature does not exceed 10° C. The mixture is allowed to warm up to room temperature and is stirred under an $N_2$ stream at this temperature for 4 h before the above reaction mixture is added dropwise to an aqueous NaOH solution of half the volume at max. 15° C. The amount of NaOH is calculated to give rise to a slight excess based on the chlorosulfonic acid used. The resulting pH is approx. pH 9 to 10. The dichloromethane is removed at max. 50° C. on a rotary evaporator under gentle vacuum.

The product is characterized by $^1$H NMR and the water content of the solution is determined (approx. 70%).

For the synthesis, the following alcohols were used.

| Alcohol | Description |
|---|---|
| C12C14 | Commercially available fatty alcohol mixture consisting of linear $C_{12}H_{25}$—OH and $C_{14}H_{29}$—OH |
| $C_{24}$ Guerbet | Commercially available $C_{24}$ Guerbet alcohol (2-decyltetradecan-1-ol), purity > 98% |
| $C_{28}$ Guerbet | Commercially available $C_{28}$ Guerbet alcohol (2-dodecylhexadecan-1-ol), purity > 98% |

Performance Tests

The surfactants obtained were used to conduct the following tests in order to assess the suitability thereof for tertiary mineral oil production.

Description of the Test Methods

Determination of SP* a) Principle of the Measurement:

The interfacial tension between water and oil was determined in a known manner via the measurement of the solubilization parameter SP*. The determination of the interfacial tension via the determination of the solubilization parameter SP* is a method for approximate determination of the interfacial tension which is accepted in the technical field. The solubilization parameter SP* indicates how many ml of oil are dissolved per ml of surfactant used in a microemulsion (Winsor type III). The interfacial tension σ (IFT) can be calculated therefrom via the approximate formula IFT≈$0.3/(SP*)^2$, if equal volumes of water and oil are used (C. Huh, J. Coll. Intert Sc., Vol. 71, No. 2 (1979)).

b) Procedure

To determine the SP*, a 100 ml measuring cylinder with a magnetic stirrer bar is filled with 20 ml of oil and 20 ml of water. To this are added the concentrations of the particular surfactants. Subsequently, the temperature is increased stepwise from 20 to 90° C., and the temperature window in which a microemulsion forms is observed.

The formation of the microemulsion can be assessed visually or else with the aid of conductivity measurements. A triphasic system forms (upper oil phase, middle microemulsion phase, lower water phase). When the upper and lower phase are of equal size and do not change over a period of 24 h, the optimal temperature ($T_{opt}$) of the microemulsion has been found. The volume of the middle phase is determined. The volume of surfactant added is subtracted from this volume. The value obtained is then divided by two. This volume is then divided by the volume of surfactant added. The result is noted as SP*.

The type of oil and water used to determine SP* is determined according to the system to be examined. It is possible either to use mineral oil itself or a model oil, for example decane. The water used may either be pure water or saline water, in order better to model the conditions in the mineral oil formation. The composition of the aqueous phase can be adjusted, for example, according to the composition of a particular deposit water.

Details of the aqueous phase used and of the oil phase can be found below in the specific description of the tests.

Test Results

A 1:1 mixture of decane and an NaCl solution was admixed with butyl diethylene glycol (BDG). Butyl diethylene glycol (BDG) functions as a cosolvent and is not included in the calculation of SP*. For this purpose, a surfactant mixture of 3 parts alkyl alkoxy sulfate and 1 part petroleumsulfonate was added. The total surfactant concentration is reported in percent by weight of the aqueous phase.

The results are shown in Table 1.

drop method on an SVT20 from DataPhysics. For this purpose, an oil droplet is injected at 20° C. into a capillary filled with saline surfactant solution and the expansion of the droplet at approx. 4500 revolutions per minute is observed until a constant value is established. This is typically the case after 2 h. The interfacial tension IFT (or $\sigma_{II}$) is calculated—as described by Hans-Dieter Dörfler in "Grenzflächen and kolloid-disperse Systeme [Interfaces and colloidally disperse systems]" Springer Verlag Berlin Heidelberg 2002—by the following formula from the cylinder diameter $d_z$, the angular speed $\omega$ and the density difference $(d_1-d_2)$:

$\sigma_{II}=0.25 \cdot d_z^3 \cdot \omega 2 \cdot (d_1-d_2)$

TABLE 1

Tests with decane

| Ex. | Alkyl-AO-SO$_4$Na:petroleumsulfonate = 3:1 | Surfactant [%] | BDG [%] | NaCl [%] | T$_{opt}$ [° C.] | SP* | IFT [mN/m] |
|---|---|---|---|---|---|---|---|
| C1 | C24C28-Guerbet (blend of C24Guerbet:C28 Guerbet = 70:30)-7 BuO-7 PO-10 EO-sulfate | 0.4 | 2 | 4 | 77 | 18.25 | 0.0009 |
| 2 | C24C26C28-Guerbet-7 BuO-7 PO-10 EO-sulfate | 0.4 | 2 | 4 | 57 | 55.75 | 0.0001 |
| 3 | C24C26C28-Guerbet-7 BuO-7 PO-6 EO-sulfate | 0.4 | 2 | 3 | 68 | 38.6 | 0.0002 |

As can be seen in Table 1, a non-claimed comparative specimen (two surfactants produced from a mixture of commercially available Guerbet alcohols) C1 gives good interfacial tension values on decane. However, as can be seen in Examples 2 and 3, even lower values are surprisingly possible. Here, ultralow interfacial tensions are attained. This is important in the case of particularly heavy crude oils (API gravity below) 20°. In such systems, it is possible to achieve low interfacial tensions only with difficulty. Therefore, in the case of these oils, the only surfactants employed should be those which have been demonstrated to be able to achieve ultralow interfacial tension values in other lighter oils.

In addition, the following studies were conducted using the example of a deposit containing heavy oil:
the crude oil has about 16° API
the deposit temperature is approx. 20° C.
and the reservoir water has approx. 16100 ppm TDS (total dissolved salt).

To a solution comprising 12000 ppm of NaCl and 4100 ppm of NaHCO$_3$ were added 0.25% of Na$_2$CO$_3$, 0.08% C$_{24}$C$_{26}$C$_{28}$-Guerbet-7BuO-7PO-10EO-sulfate, 0.02% Petrostep S3B (internal olefinsulfonate from Stepan), 0.05% butyl diethylene glycol and 0.07% Sokalan® PA 20 (polyacrylate sodium salt), or 0.25% Na$_2$CO$_3$, 0.07% C$_{24}$C$_{26}$C$_{28}$-Guerbet-7BuO-7PO-10EO-sulfate, 0.03% Petrostep S3B (internal olefinsulfonate from Stepan), 0.05% butyl diethylene glycol and 0.07% Sokalan® PA 20 (polyacrylate sodium salt). The total surfactant concentration and the amount of Na$_2$CO$_3$ relate to the active substance and are reported in percent by weight of the aqueous phase.

Interfacial tensions of crude oil in the presence of the surfactant solution are determined at 20° C. by the spinning The test results are shown in Table 2.

TABLE 2

Tests with crude oil

| Ex. | Surfactant formulation | Na$_2$CO$_3$ | NaCl + NaHCO$_3$ | IFT | Solubility in the binary system at 20° C. |
|---|---|---|---|---|---|
| 4 | 0.08% C$_{24}$C$_{26}$C$_{28}$-Guerbet-7BuO-7PO-10EO-sulfate, 0.02% Petrostep S3B, 0.05% butyl diethylene glycol, 0.07% Sokalan PA 20 | 0.25% | 1.2% + 0.41% | 0.0026 mN/m | clear |
| 5 | 0.07% C$_{24}$C$_{26}$C$_{28}$-Guerbet-7BuO-7PO-10EO-sulfate, 0.03% Petrostep S3B, 0.05% butyl diethylene glycol, 0.07% Sokalan PA 20 | 0.25% | 1.2% + 0.41% | 0.0024 mN/m | clear |
| 6 | 0.06% C$_{24}$C$_{26}$C$_{28}$-Guerbet-7BuO-7PO-10EO-sulfate, 0.04% Petrostep S3B, 0.05% butyl diethylene glycol, 0.07% Sokalan PA 20 | 0.25% | 1.2% + 0.41% | 0.0028 mN/m | clear |
| C7 | 0.08% C$_{24}$-Guerbet-7BuO-7PO-10EO-sulfate, 0.02% Petrostep S3B, 0.05% butyl diethylene glycol, 0.07% Sokalan PA 20 | 0.25% | 1.2% + 0.41% | 0.0603 mN/m | slightly cloudy |

TABLE 2-continued

Tests with crude oil

| Ex. | Surfactant formulation | Na$_2$CO$_3$ | NaCl + NaHCO$_3$ | IFT | Solubility in the binary system at 20° C. |
|---|---|---|---|---|---|
| C8 | 0.08% C$_{28}$-Guerbet-7BuO-7PO-10EO-sulfate, 0.02% Petrostep S3B, 0.05% butyl diethylene glycol, 0.07% Sokalan PA 20 | 0.25% | 1.2% + 0.41% | 0.0564 mN/m | slightly cloudy |

As can be seen from the examples 4, 5 and 6, it is also possible to achieve a very low interfacial tension in each case with the aid of the surfactants claimed in a heavy crude oil (API gravity below 20°). The surfactant solution is clear in each case and allows problem-free injection into a porous rock of suitable permeability.

The comparative examples C7 and C8 are based on surfactant formulations comprising surfactants based on only one Guerbet alkyl radical (C24-Guerbet, C28-Guerbet resp). These surfactants show under identical conditions considerably higher interfacial tension as inventive surfactants as can be seen from a comparison of example 4 (C24C26C28 Guerbet) and comparative examples C7 (C24-Guerbet) and C8 (C28-Guerbet).

The invention claimed is:

1. A surfactant mixture comprising at least three ionic surfactants which differ in terms of the hydrocarbyl moiety (R$^1$)(R$^2$)—CH—CH$_2$— and are of the general formula (I)

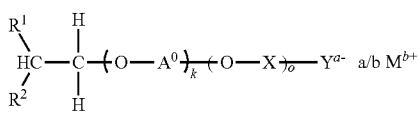

(I)

where
R$^1$ is a linear saturated or unsaturated aliphatic hydrocarbyl radical having 10 or 12 carbon atoms;
R$^2$ is a linear saturated or unsaturated aliphatic hydrocarbyl radical having 12 or 14 carbon atoms;
wherein the R$^1$ and R$^2$ radicals are selected such that the at least 3 ionic surfactants of the general formula (I) give rise to hydrocarbyl radicals (R$^1$)(R$^2$)CHCH$_2$— with 24 carbon atoms, 26 carbon atoms and 28 carbon atoms, wherein the C$_{24}$ surfactant of the general formula (I) is within a range from 40% to 60%, the C$_{26}$ surfactant of the general formula (I) within a range from 30% to 50% and the C$_{28}$ surfactant of the general formula (I) within a range from 7% to 20%, based on the the molar sum formed from these three surfactants;
each A$^0$ is independently ethylene, propylene or butylene;
k is an integer from 1 to 99,
X is a branched or unbranched hydrocarbylene group which has 1 to 10 carbon atoms and is optionally substituted by an OH group;
o is 0 or 1;
M$^{b+}$ is a cation;
Y$^{a-}$ is a sulfate group, sulfonate group, carboxylate group or phosphate group;
b is 1, 2 or 3 and
a is 1 or 2.

2. The surfactant mixture according to claim 1, wherein k is an integer in the range from 4 to 50.

3. The surfactant mixture according to claim 1, wherein the (O—X)$_o$—Y$^{a-}$ radical in formula (I) is OS(O)$_2$O$^-$, OCH$_2$CH$_2$S(O)$_2$O$^-$, OCH$_2$CH(OH)CH$_2$S(O)$_2$O$^-$, O(CH$_2$)$_3$S(O)$_2$O$^-$, S(O)$_2$O$^-$, CH$_2$C(O)O$^-$ or CH$_2$CH(R')C(O)O$^-$, where R' is hydrogen or an alkyl radical having 1 to 4 carbon atoms.

4. The surfactant mixture according to claim 1, wherein (O-A$^0$-)$_k$ in formula (I) represents n butyleneoxy, m propyleneoxy and l ethyleneoxy groups, where n+m+l=k.

5. The surfactant mixture according to claim 4, wherein the n butyleneoxy, m propyleneoxy and l ethyleneoxy groups are arranged in blocks.

6. The surfactant mixture according to claim 5, wherein the (R$^1$)(R$^2$)—CH—CH$_2$— radical in formula (I) is followed, representing (O-A$^0$-)$_k$, by a butyleneoxy block with n butyleneoxy groups, followed by a propyleneoxy block with m propyleneoxy groups, and finally an ethyleneoxy block with l ethyleneoxy groups.

7. The surfactant mixture according to claim 4, wherein m is an integer from 4 to 15 and/or l is an integer of 0 to 25 and/or n is an integer from 2 to 15.

8. The surfactant mixture according to claim 1, wherein the mixture further comprises surfactants of the formula

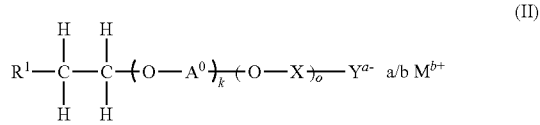

(II)

and of the formula

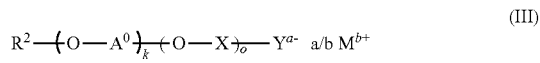

(III)

where R$^1$, R$^2$, A$^0$, X, Y$^{a-}$, M$^{b+}$, k, o, a and b are each as defined for formula (I).

9. The surfactant mixture according to claim 8, wherein the proportion of surfactants of the formula (I) in relation to the sum of the amounts of surfactants of the formulae (I), (II) and (III) is in the range from 80% by weight to 99% by weight.

10. An aqueous surfactant formulation comprising the surfactant mixture according to claim 1, said surfactant formulation having a total surfactant content of 0.05 to 5% by weight based on the total amount of the aqueous surfactant formulation.

11. A process for preparing the surfactant mixture according to claim 1, comprising:
(a) preparing Guerbet alcohols of the general formula (IV)

(IV), where R$^1$ and R$^2$ are each as defined in claim 1, by condensing a mixture of at least two primary alcohols of the formula R—CH$_2$—CH$_2$—OH, where R is a linear or branched, saturated or unsaturated aliphatic hydrocarbyl radical having 10 to 12 carbon atoms,
(b) alkoxylating the alcohols obtained in process step (a),
(c) reacting the alcohol alkoxylates obtained in step (b) with a Y$^{a-}$ group, optionally to form a spacer group OX.

* * * * *